March 20, 1962 F. C. MOCK 3,025,668
GAS TURBINE ENGINE HAVING COORDINATED FUEL, COMPRESSOR
OUTLET AREA AND TURBINE INLET AREA CONTROL
Filed Dec. 15, 1958 11 Sheets-Sheet 1

INVENTOR.
FRANK C. MOCK.
BY
*James L. O'Brien*
ATTORNEY

FIG. 5

INVENTOR.
FRANK C. MOCK.
BY
ATTORNEY.

INVENTOR.
FRANK C. MOCK.
BY
James L. O'Brien
ATTORNEY.

INVENTOR.
FRANK C. MOCK.
BY James L. O'Brien
ATTORNEY.

3,025,668
Patented Mar. 20, 1962

3,025,668
GAS TURBINE ENGINE HAVING COORDINATED FUEL, COMPRESSOR OUTLET AREA AND TURBINE INLET AREA CONTROL
Frank C. Mock, South Bend, Ind., assignor to The Bendix Corporation, a corporation of Delaware
Filed Dec. 15, 1958, Ser. No. 780,531
5 Claims. (Cl. 60—39.24)

The present invention relates generally to gas turbine engines and more particularly to apparatus and method for improving the efficiency and response of such engines. The invention is particularly useful for gas turbine engines utilized to drive land vehicles and in other applications where fuel economy at part load is highly important, where the power plant must operate under a wide range of loads and speeds, where ease of power selection is important and where rapid acceleration from a part load condition is an important consideration. The invention is, however, not limited to such applications and has for example additional utility in gas turbine engines for aircraft.

The thermal efficiency and power per unit fuel consumed are, in a heat engine, proportional to the percentage drop in the cycle during the working stroke; and, therefore, generally to the compression ratio of the compression cycle, so long as the pressure at the start of compression and the pressure at the end of expansion are approximately equal. In an ordinary gas turbine engine, the compression ratio varies approximately as the square of the air handled. The result is, that a power below maximum, the fuel consumption is very high for the power developed. Some of the thermal efficiency may be restored by the use of heat exchangers or regenerators; but these are bulky and add greatly to the space required for the engine. They are also subject to warping and leakage; and they tend to be easily clogged with carbon and dust. A disadvantage of the ordinary gas turbine engine for automotive use is that the powers required for operation at ordinary traffic speeds can only be obtained by greatly reducing the engine speed with the result that when full power is demanded much effort is consumed in accelerating the compressor and turbine wheels up to the high power speeds whereby the vehicle acceleration itself is objectionably slow.

It is an object of my invention to provide in a gas turbine engine a control for improving the thermal efficiency and response time for changes in power;

Another object of my invention is to provide in a gas turbine engine a control for varying air and/or fuel flow in the engine to increase the flexibility and adaptability of the engine to widely varying requirements.

These and other objects and advantages of the invention will become readily apparent in view of the following detailed description taken in connection with the attached drawings in which.

Figure 1:
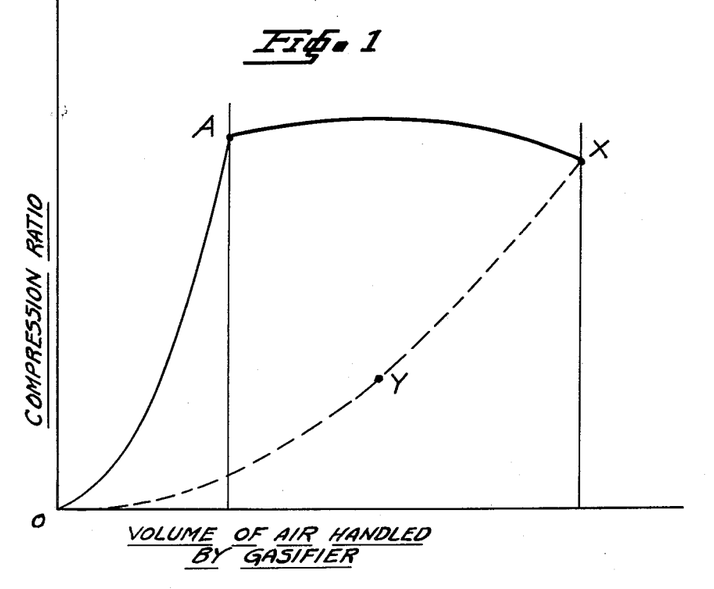
FIGURES 1, 2 and 3 are graphs showing certain operating characteristics of a gas turbine engine embodying the present invention.

Referring now to the drawings and more particularly to FIGURE 1, the dotted line represents the operating characteristics of an ordinary gas turbine engine where the compression ratio varies approximately as the square of the air flow which in turn varies as a function of engine speed. When the ordinary gas turbine engine is operated at power outputs below 0.7 of the maximum, the specific fuel consumption is in the order of twice the maximum power specific fuel consumption. The present invention provides for control of the compression ratio in proportion to the volume of air consumed whereby the engine may have an operating characteristic illustrated by the line OAX in FIGURE 1 rather than OYX of an ordinary engine. An operating characteristic defined by line OAX provides greater thermal efficiency throughout the operating range of the engine and also provides for higher operating speeds at all points below maximum power with a resulting increase in engine response or vehicle acceleration rate.

The operating characteristic between points A and X of FIGURE 1 accounts for approximately the upper two-thirds of the power range of the engine. Power variation between points A and X is obtained by keeping the engine at approximately constant speed, coordinating fuel feed to air flow so that the turbine inlet gas temperature is at a safe maximum and by simultaneously varying the effective capacity of the compressor and the turbine which drives it, as will be explained later. The curve between A and X of FIGURE 1 represents high efficiency operation. It is, however, possible to utilize the control of the present invention to operate the engine in the region between the curves OAX and OYX by varying engine speed, engine temperature and the effective capacities of the compressor and turbine as desired.

Figure 2:
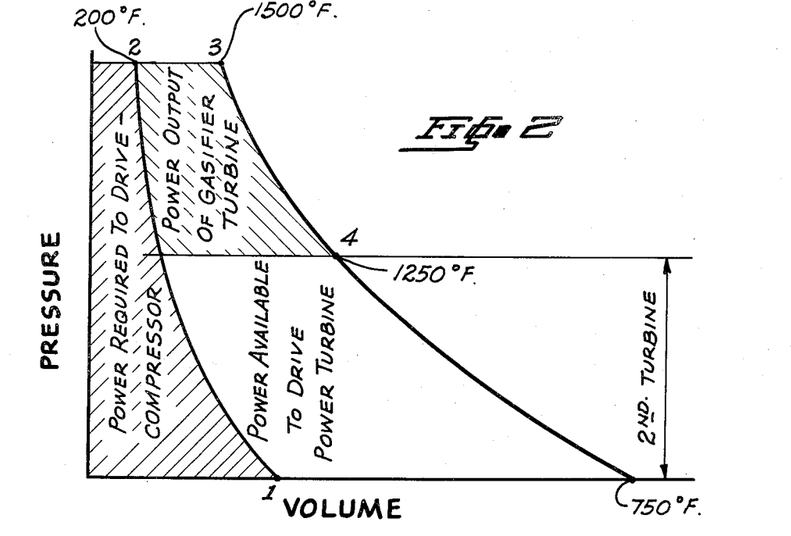
Figure 3:
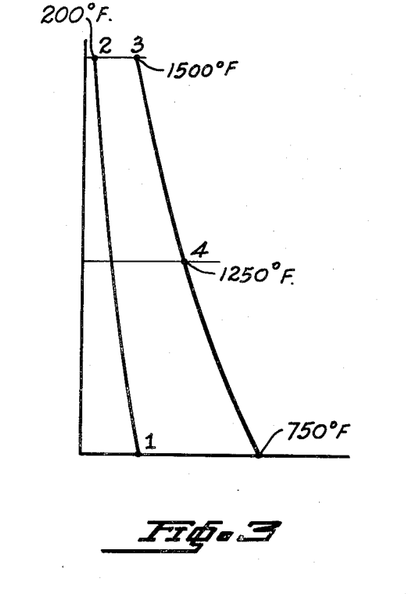

FIGURES 2 and 3 show the effect of varying the capacities of the compressor and the turbine which drives it. FIGURE 2 represents the operating characteristics of the engine with the compressor and turbine operating at maximum capacity, and FIGURE 3 represents minimum capacity operation.

Figure 4:
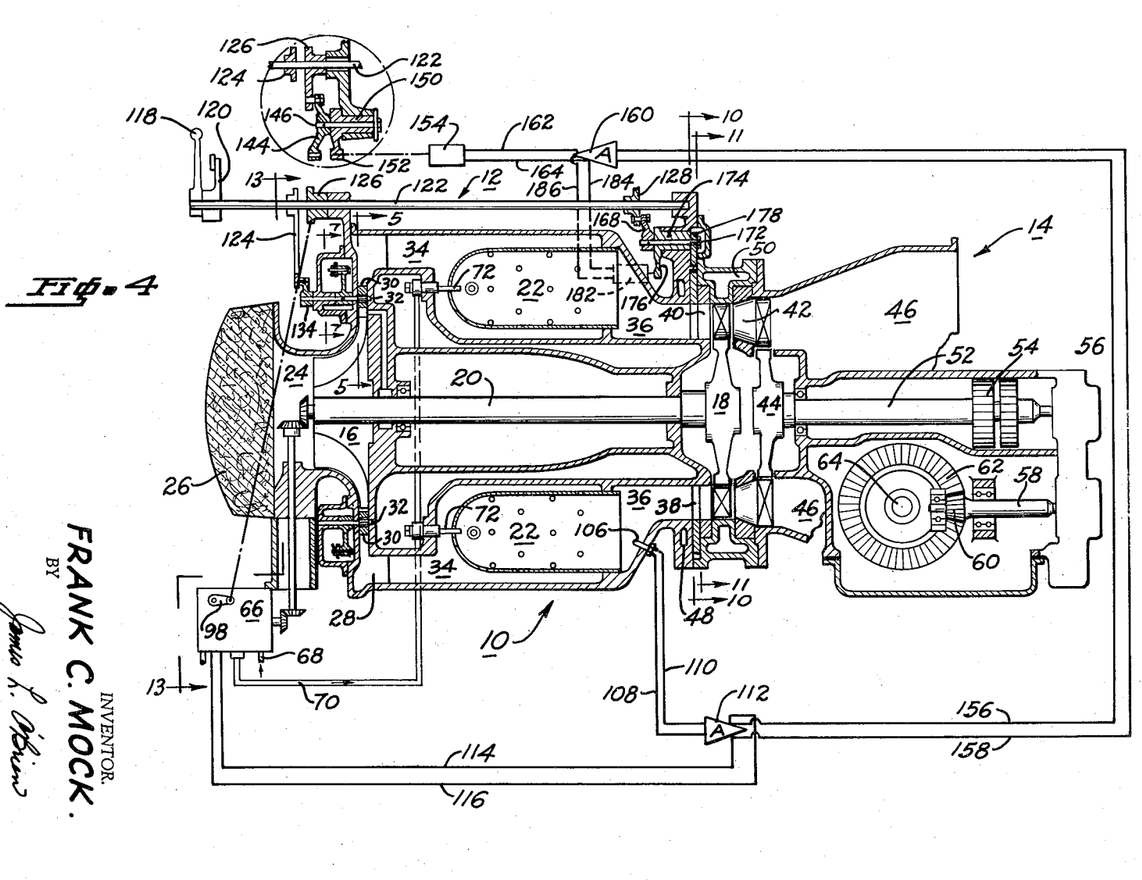
FIGURE 4 is a sectional view of a gas turbine engine embodying the present invention.

Referrin now to FIGURE 4, numeral 10 designates a gas turbine engine having a gasifier section 12 and a power section 14. The gasifier section includes a compressor 16, driven by a turbine 18 through a shaft 20 and combustion chambers 22 into which air from the compressor is discharged and from which the products of combustion are delivered to the turbine. As illustrated the compressor 16 is of the centrifugal type, although other types are suitable, and is provided with an air inlet 24 covered by a filter 26. The compressor 16 discharges into an annular or circumferential discharge casing 28 through a plurality of adjustable diffuser blades or valve means 30 which are each rotatably mounted on pivots 32 journaled in the side walls of casing 28. A plurality of passages 34 provides flow paths from the discharge casing 28 to the combustion chambers 22.

The products of combustion are discharged from the combustion chambers 22 through passages 36, movable shield or valve 38, diaphragm guide vane member 40 through gasifier turbine 18, stator 42, power turbine 44 and finally through the exhaust pipe 46. Passages 36 and the turbine section are surrounded by water or cooling fluid passages 48 and 50 respectively which cool the engine and provide a source of heat for the passenger compartment of the vehicle which the engine is adapted to propel.

Power turbine 44 is secured to a shaft 52 which is connected through a clutch 54, suitable gearing in housing 56 and shaft 58, gears 60 and 62 to a drive shaft 64 which is adapted to drive the vehicle (not shown).

A fuel control 66 is supplied with fuel from a suitable source (not shown) through conduit 68 and delivers it to the engine via discharge passage 70 and nozzles 72, the latter being respectively disposed to discharge into combustion chambers 22. Fuel control 66 includes a spool valve 74 which is operatively connected to an adjustable governor 76 by means of rod 78. Governor 76 includes a pair of flyweights 80 which are rotated as a function of engine speed through shaft 82, gears 84, rod 86 and gears 88. Valve 74 is urged toward open position by a spring 90 which reacts between an adjustable collar 92 and a bearing member 94, the latter being secured to the end of rod 78. The flyweights 80 exert a force as a function of engine speed to oppose the force of spring 90 and urge valve 74 towards closed position. The governor is adjusted by adjusting collar 92 by means of forked lever 96 and crank 98. A drain passage 100 is provided to remove leakage fluid from chamber 102 in which valve 74 reciprocates. Fuel control 66 is provided with a valve 104 which is regulated in response to turbine inlet temperature by means of a temperature probe or thermocouple 106, conductors 108 and 110, amplifier 112 and conductors 114 and 116.

A control lever 118 having a quadrant 120 is provided to give coordinated control of the diffuser blades 30, movable shield 38 and governor 76 in accordance with a predetermined schedule which may be designed to meet various engine requirements. For convenience the control lever 118 and quadrant 120 have been superimposed on FIGURES 13, 14, 15, and 18 to illustrate the position of the lever 118 with respect to the elements controlled by it. Control lever 118 is secured to a shaft 122 which carries diffuser blade cam 124, governor cam 126 and turbine shield cam 128.

Figure 6:
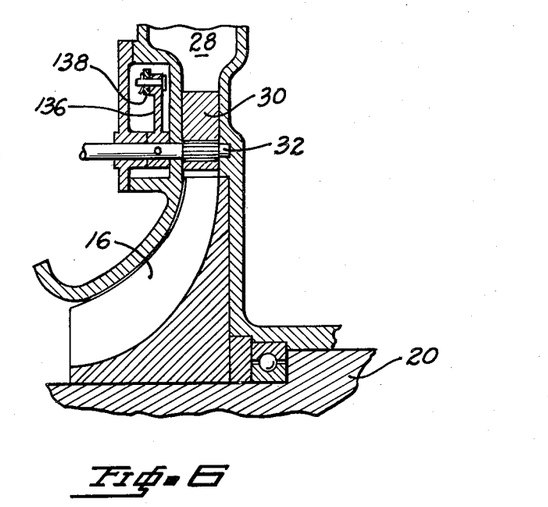
FIGURE 6 is an enlarged, fragmentary view of the diffuser blade shown in FIGURE 4.
Figure 7:
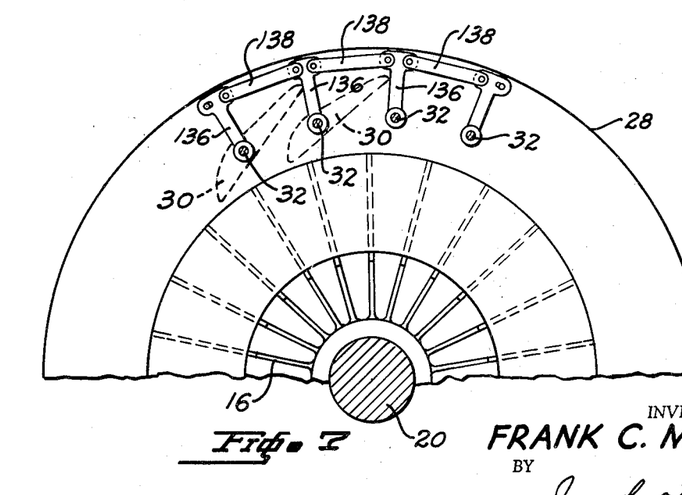
FIGURE 7 is a view taken substantially along line 7—7 of FIGURE 4.
Figure 8:
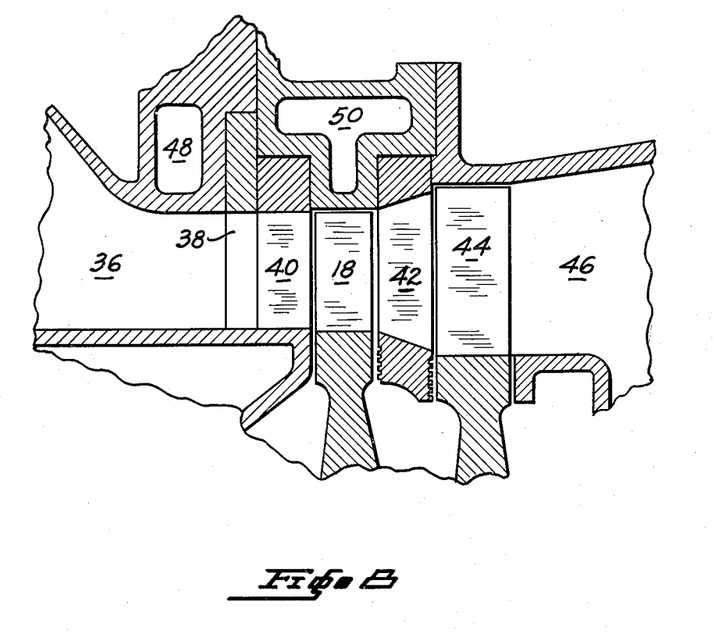
FIGURE 8 is an enlarged, fragmentary view of the turbine and gate shown in FIGURE 4.
Figures 9, 10, 11:
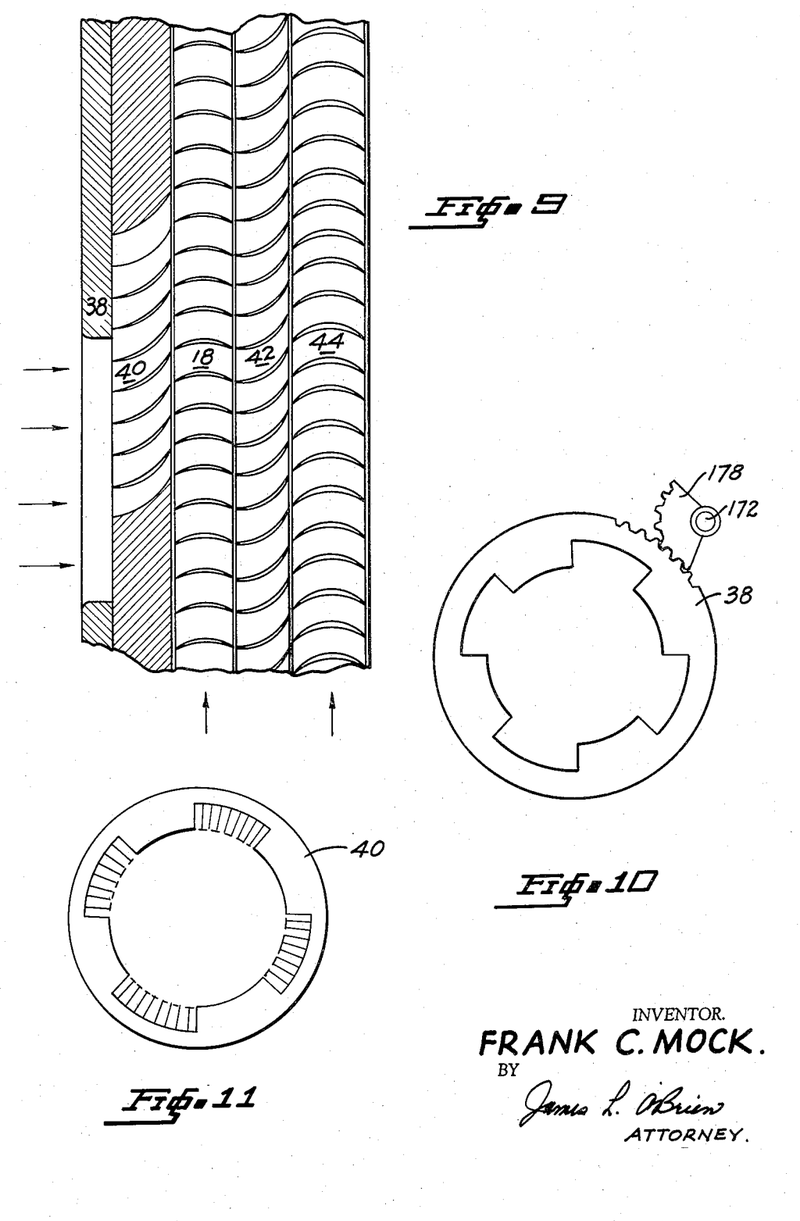
FIGURE 9 is a developed section of the periphery of the turbine and gate shown in FIGURE 8.
FIGURE 10 is a view taken along line 10—10 of FIGURE 4.
FIGURE 11 is a view taken along line 11—11 of FIGURE 4.
Figure 12:
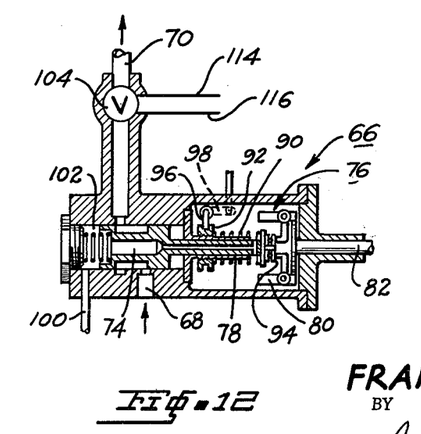
FIGURE 12 is a schematic view of the governor shown in FIGURE 4.
Figure 13:
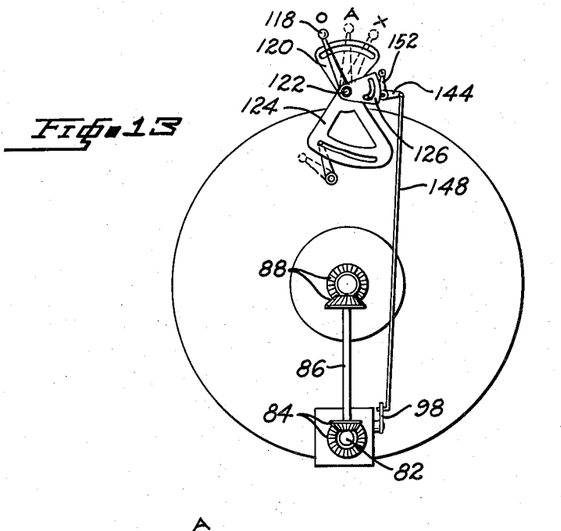
FIGURE 13 is a view taken along line 13—13 of FIGURE 4.
Figure 14:
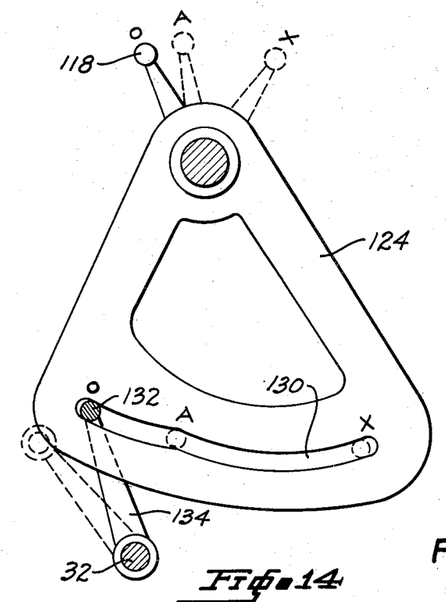
FIGURE 14 is an enlarged view of the diffuser blade control cam shown in FIGURE 13.

Diffuser blade cam 124 is provided with a slot 130, FIGURE 14, which carries a pin 132 fixed to the end of a lever 134 which in turn is secured to the end of one of pivots 32. A plurality of levers 136, FIGURES 6 and 7, are respectively connected at one end to pivots 32 and at the other end are joined to adjacent levers by links 138 which are pinned to the levers. At least one of the links 138 is loosely pinned to a lever 136 to provide a slight amount of slack in the ring. This slack is taken up by a relatively stiff spring (not shown). The construction above described is such that rotation of lever 134 by cam 124 causes all of the diffuser blades 30 to rotate in unison whereby the compressor discharge area or the flow of air through the compressor is varied as a function of the contour of cam 124 and the amount of rotation. Referring to FIGURE 14, the diffuser blades are in a minimum flow or minimum discharge area position when the pin 132 is between O and A. The blades are opened while pin 132 traverses from A to X and reach a maximum flow position or maximum discharge area position when pin 132 is at X.

Figure 17:
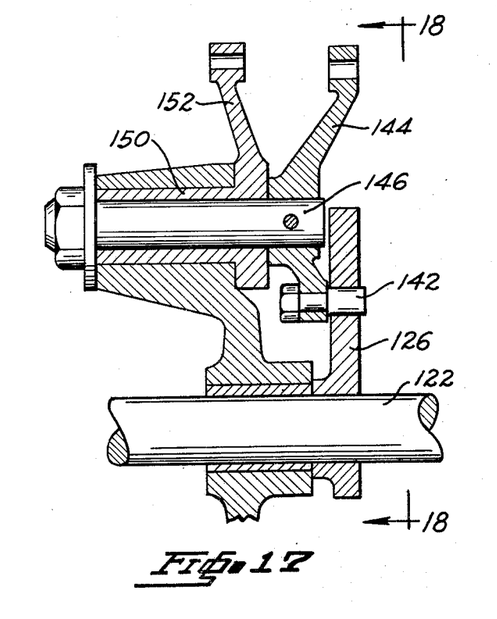
FIGURE 17 is an enlarged view of the governor control shown in FIGURE 4.
Figure 18:
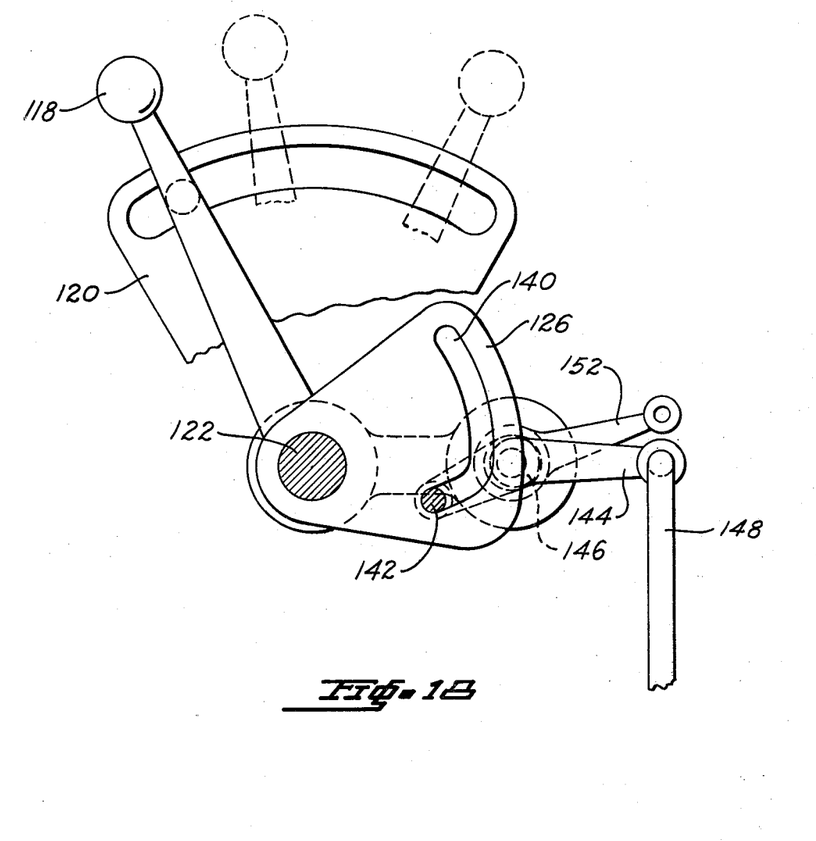
FIGURE 18 is a view taken along line 18—18 of FIGURE 17.

The governor cam 126 is provided with a slot 140, FIGURE 18, which carries a pin 142 secured to one end of a crank 144 which is rotatably mounted on a shaft 146. The other end of crank 144 is secured to a rod 148 which is in turn connected to crank 98 for adjusting governor 76. Shaft 146 is mounted in an eccentric bushing 150, FIGURE 17, having a trim lever 152 formed integrally therewith. Trim lever 152 may be operated manually or by other suitable means such as the lever motor designated 154 to adjust governor 76 independently of control lever 118. Motor 154 is actuated in response to an engine operating condition such as turbine inlet temperature. Thermocouple 106 is operatively connected to motor 154 through conductors 108 and 110, amplifier 112, conductors 156 and 158, amplifier 160 and conductors 162 and 164.

Figure 15:
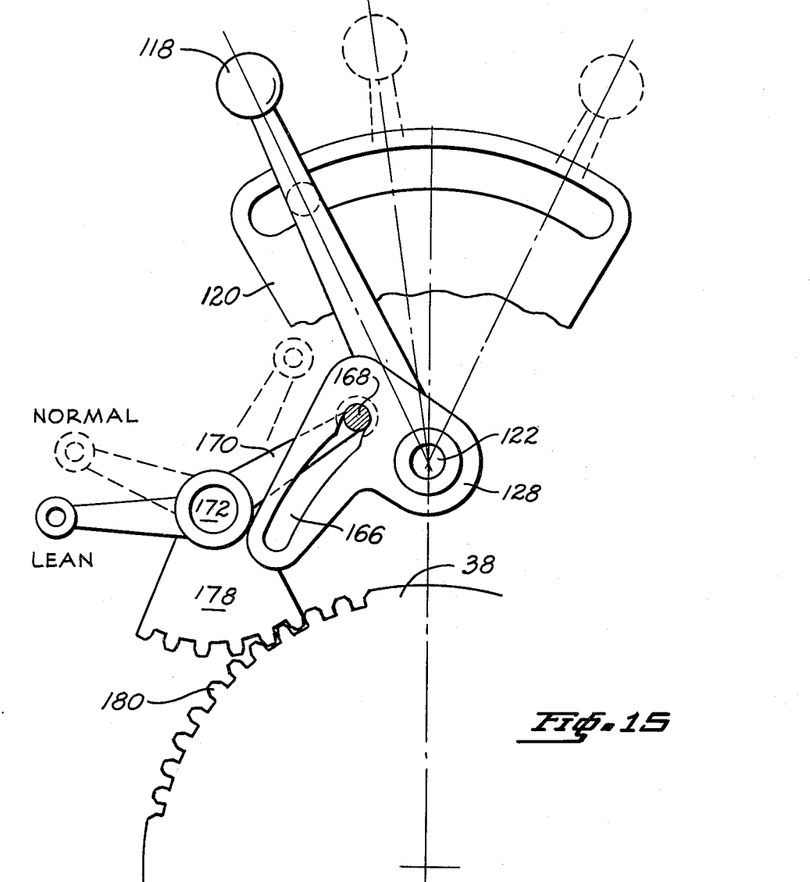
FIGURE 15 is an enlarged diagrammatic view of the turbine gate shown in FIGURE 10 together with its control cam.
Figure 16:
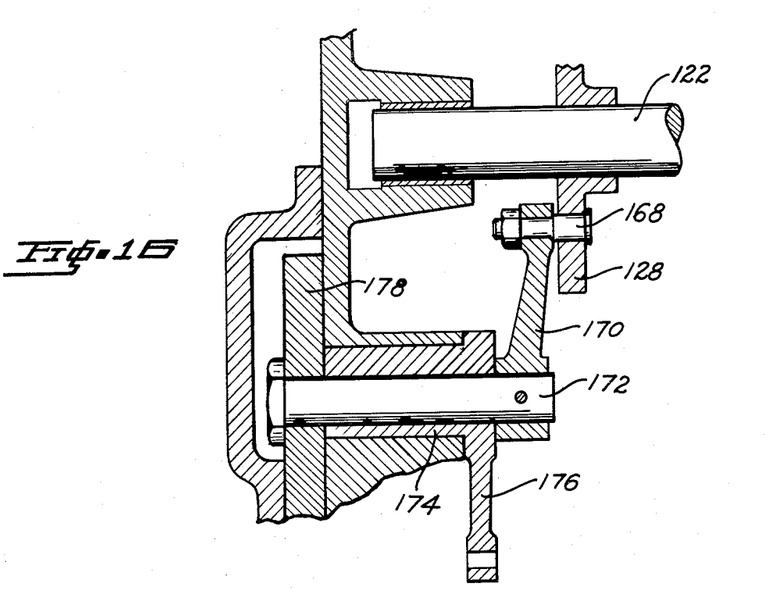
FIGURE 16 is an enlarged view of the turbine gate control shown in FIGURE 4.

Turbine shield cam 128, FIGURE 15, is provided with a slot 166 which carries a pin 168 secured to a lever 170 which is rotatably mounted on a shaft 172. Shaft 172 is rotatably disposed within an eccentric bushing 174, FIGURE 16, which has a trim lever 176 formed integrally therewith. A gear segment 178 is secured to shaft 172 and is in meshing engagement with a gear segment 180 formed on the periphery of shield 38. Trim lever 174 may be actuated manually or by suitable means in response to an engine operating condition. As shown, trim lever 176 is regulated as function of turbine inlet temperature by means of an electric motor 182 which is operatively connected to thermocouple 106 by means of conductors 108 and 110, amplifier 112, conductors 156 and 158, amplifier 160 and conductors 184 and 186.

In the operation of the device described thus far, the control lever 118 coordinately controls the effective capacities of the compressor 16 and gasifier turbine 18 and adjusts the governor 76 in accordance with a predetermined schedule as determined by the cams 124, 128 and 126. The schedule may be set for optimum thermal efficiency and/or acceleration response such as represented by the curve OAX of FIGURE 1 and exemplified by the cam contours shown in the various figures of the drawings, or the schedule may be set to provide any desired operating characteristic below curve OAX. As illustrated, the cam slots are contoured whereby upon opening movement of control lever 118 the governor 76 is adjusted to bring the engine up to a predetermined speed while cams 124 and 128 hold the diffuser blades and turbine shields in their minimum flow positions. Upon further opening movement of lever 118 the governor maintains the engine speed substantially constant at the predetermined value while the diffuser blades and turbine shield are moved toward their maximum flow position.

The trim levers 152 and 176 provide adjustment to provide exact coordination of the control elements to compensate for individual engine operating characteristics or changes in operating characteristics due to engine deterioration. The trim levers also permit the engine operator to make a limited departure from the scheduled control if he so desires.

Trim levers have been provided for both the turbine shield or gate control and the governor control and as shown have been made responsive to turbine inlet temperature. Generally one such trim lever will suffice. If the turbine inlet temperature is too high, actuating trim lever 152 to reduce the governor setting will reduce the temperature. Similarly, actuating trim lever 176 to open the turbine shield 38 would put a greater pressure differential through turbine 38, producing more power thereby speeding up the compressor, after which the governor would reduce the fuel and the turbine inlet gas temperature.

Since the collective effect of these elements of (a) compressor speed; (b) combustion temperature; (c) compressor outlet area; and (d) exhaust gate area; upon the thermal efficiency is rather complex, these relations may be restated as follows:

(1) The fuel feed may be considered as proportional to the air mass flow times the temperature rise during combustion;

(2) The efficiency of this cycle will vary with the temperature rise of combustion, which thus calls for the minimum weight of air for a given power, compatible with safe turbine temperatures;

(3) The efficiency of the cycle will depend greatly upon the expansion ratio through the turbine, which ratio increases with the compressor speed, and decreases if the exhaust gate is opened too wide;

(4) In determining the proper air mass flow for a given power point, if the exhaust gate area is too small in proportion to the compressor outlet area, the compressor will encounter the well known "stall" condition; but if the exhaust gate area is too large, the combustion chamber pressure for a given fuel feed will drop, as just mentioned in (3).

Within practical limits, it is not necessary to hold exact ratios of the compressor outlet and exhaust gate areas to the compressor speed and fuel flow. One simply expressed expedient is, through as wide a part of the operating range as possible, to hold the combustion chamber temperature to a fixed safe maximum by automatic thermal limitation of the fuel feed: to simultaneously hold the compressor speed to a safe maximum by a speed governor working on the fuel feed: and then to obtain the desired power selection by proper mutual variation of the compressor outlet and turbine gate areas.

In general the coordination of the three controls, viz. diffuser blades, turbine shield and governor, is non-linear in the ratio of movement of control lever to the effect obtained thereby requiring control by non-linear or cam elements. Furthermore, coordination of these controls to obtain optimum performance from individual engines having different operating characteristics makes it desirable to provide adjustment of at least one element with respect to the other two.

Figure 5:
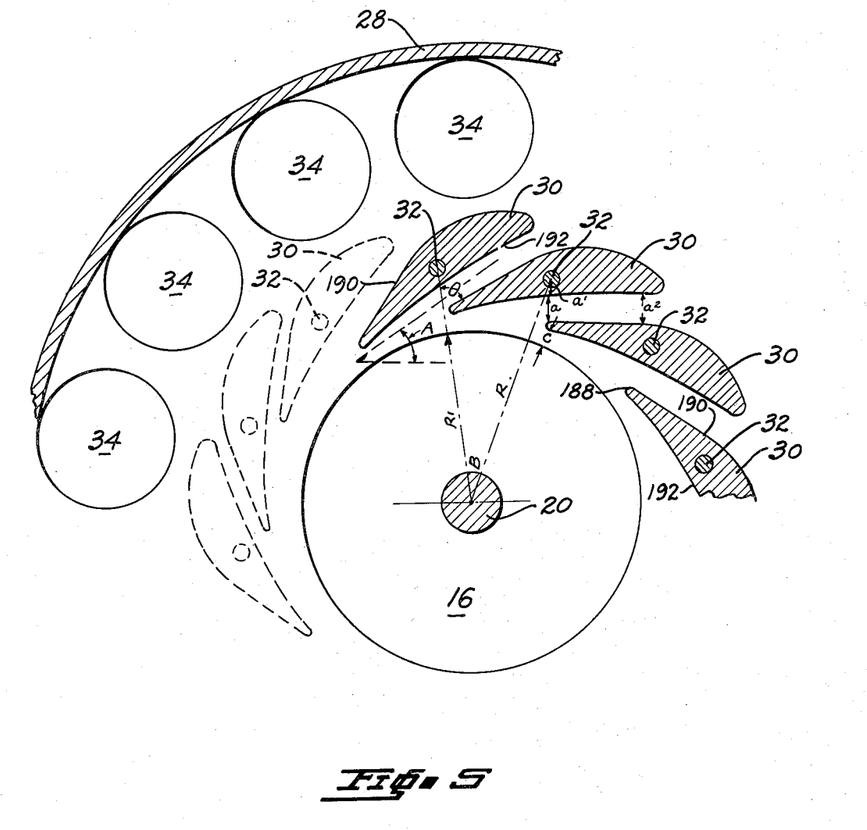
FIGURE 5 is a sectional view taken along line 5—5 of FIGURE 4.

It is also important that the diffuser blades 30 be carefully designed and located to obtain optimum performance of the engine. Referring now to FIGURE 5, the pivots 32 are uniformly spaced along a circle having a radius R in accordance with the formula $$R = R_1 + C + \frac{a + a_1}{\sin \theta}$$

where $R_1$ is the radius of compressor 16
$C$ is the minimum clearance between the inner end 188 of the blades 30 and the periphery of compressor 16
$a$ is the width of the discharge orifice measured between an end 188 of one blade and the closest point of an adjacent blade,
$a_1$ is one-half the width of a blade at the pivot point
$\theta$ is the angle between a radius passing through center of compressor 16 and the pivot of one blade and the side portion of an adjacent blade, or is equal to $A - B$ where $A$ is the angle of the longitudinal axis of the discharge orifice and $$B = \frac{360°}{\text{no. of blades}}$$

The blades 30 should have substantially straight side portions 190 and 192 respectively which terminate in a rounded inner end portion 188. The side portions 190 and 192 of adjacent blades are slightly divergent so that A, and $A_2$ as shown in FIGURE 5 are related in accordance with the following formula $$\left[\frac{A_2}{A_1}\right]^2 = \frac{0.0670}{(P/P_0)1.43[1 - (P/P_0)0.286]}$$

where $A_1$ is the area of the throat of discharge duct
$A_2$ is the area of the duct at a given point downstream of the throat
$P$ is the static pressure at $A_2$ $P_0$ is the total pressure outside the duct at the entrance to the throat.

The choice of minimum clearance between the blades 30 and the periphery of compressor 16 is influenced by the noise level created by bringing the discharge ducts in proximity to the compressor periphery. In a given installation the minimum clearance is determined by trial and error until an acceptable noise level is reached. An important feature of the blade design shown in FIGURE 5 is that a considerable change in the throat area is obtained with relatively small angular changes of the blades and that the change in throat area is symmetrical about the longitudinal axis of the throat, i.e. adjacent blades play a substantially equal part in the throat area change. Another important feature of the blade design is that the substantially straight side portions 190 and 192 reduce turbulence and heat rise through the diffuser.

While only one embodiment of my invention has been shown and described it will be obvious that various modifications and arrangements may be made without departing from the scope of the invention.

I claim:

1. A gas turbine engine including a compressor, a turbine driving the compressor, a combustion chamber into which air from the compressor is discharged and from which the products of combustion are delivered to the turbine, means for controlling the speed of the engine, means for controlling the discharge from said compressor, means for controlling the admission to said turbine, control means operatively connected to said previously mentioned means effective to vary engine speed from idle speed to a higher predetermined value while maintaining said second and third mentioned means in a predetermined minimum flow position, said last mentioned means being effective to vary said second and third mentioned means from said predetermined minimum flow position to a predetermined maximum flow position while maintaining engine speed substantially constant at said higher predetermined value.

2. A gas turbine engine including a compressor, a turbine driving the compressor, a combustion chamber into which air from the compressor is discharged and from which the products of combustion are delivered to the turbine, a passage for supplying fuel to said combustion chamber, a fuel valve for varying the flow through said passage to vary the speed of the engine, a manually adjustable governor adapted to be driven by the engine and operatively connected to said fuel valve for automatically positioning said valve to regulate the engine speed at a value determined by the governor adjustment, a compressor outlet valve and a turbine inlet valve for respectively varying the compressor outlet area and turbine inlet area from predetermined minimum values to predetermined maximum values, manual means operatively connected to said governor and said outlet and inlet valves for sequentially adjusting said governor to obtain a predetermined engine speed while maintaining said inlet and outlet valves in their minimum positions and for coordinately moving said outlet and inlet valves toward their maximum positions while maintaining engine speed substantially constant at said predetermined value, and means responsive to engine temperature for controlling said turbine inlet valve independent of said manual means.

3. In a gas turbine engine having a compressor, a turbine driving the compressor, a combustion chamber into which air from the compressor is discharged and from which the products of combustion are delivered to the turbine and a passage for supplying fuel to the combustion chamber, the combination comprising a fuel valve for varying the flow through said passage, a manually adjustable governor adapted to be driven by the engine and operatively connected to said fuel valve for automatically positioning said valve to regulate the engine speed at a value determined by the governor adjustment, valve means for regulating the flow through said compressor, valve means for regulating the flow through said turbine, manual means operatively connected to said governor and valve means to sequentially adjust said governor to obtain a predetermined engine speed and thereafter to coordinately move said valve means toward their maximum flow positions and means responsive to engine temperature operatively connected to one of said valve means for actuating said valve means independently of said manual means.

4. A gas turbine engine including a compressor, a turbine driving the compressor, a combustion chamber into which air from the compressor is discharged and from which the products of combustion are delivered to the turbine, a passage for supplying fuel to said combustion chamber, a fuel valve for varying the flow through said passage, manually adjustable governor means adapted to be driven by the engine and operatively connected to said fuel valve for automatically positioning said valve to regulate the engine speed at a value determined by the governor adjustment, valve means in said engine disposed on opposite sides of said combustion chamber for controlling the total flow through said engine, control means for adjusting said governor to accelerate said engine to a predetermined speed while maintaining said valve means in predetermined minimum flow positions, said control means being effective to coordinately open said valve means after said governor has been adjusted for said predetermined engine speed, and temperature responsive means for varying one of said valve means independently of the other of said valve means.

5. A gas turbine engine including a compressor; a turbine driving the compressor; a combustion chamber into which air from the compressor is discharged and from which the products of combustion are delivered to the turbine; a passage for supplying fuel to said combustion chamber; a fuel valve for varying the flow through said passage to vary the speed of the engine; a manually adjustable governor adapted to be driven by the engine and operatively connected to said fuel valve for automatically positioning said valve to regulate the engine speed at a value determined by the governor adjustment; a compressor outlet valve and a turbine inlet valve for respectively varying the compressor outlet area and turbine inlet area from predetermined minimum values to predetermined maximum values; a rotatable power control shaft; a governor cam; compressor cam and turbine cam secured to said shaft; a governor cam follower actuated by said governor cam and operatively connected to said governor; means for actuating said governor cam follower independently of said governor cam; a compressor cam follower actuated by said compressor cam and operatively connected to said compressor outlet valve; a turbine cam follower actuated by said turbine cam and operatively connected to said turbine inlet valve and means for actuating said turbine cam follower independently of said turbine cam; said cams being contoured so that rotation of said power control shaft from minimum power position toward maximum power position adjust said governor to increase engine speed from a minimum value to a predetermined maximum value while maintaining said inlet and outlet valves in their minimum flow positions and thereafter moving said inlet and outlet valves toward their maximum flow positions while maintaining engine speed substantially constant at said predetermined value.

References Cited in the file of this patent
UNITED STATES PATENTS

| | | |
|---|---|---|
| 2,382,913 | Robinson | Aug. 14, 1945 |
| 2,392,200 | Thompson | Jan. 1, 1946 |
| 2,603,063 | Ray | July 15, 1952 |
| 2,672,726 | Wolf et al. | Mar. 23, 1954 |
| 2,688,844 | McLeod et al. | Sept. 14, 1954 |
| 2,715,814 | Barr | Aug. 23, 1955 |
| 2,836,035 | Chappell et al. | May 27, 1958 |
| 2,837,894 | Kind | June 10, 1958 |
| 2,931,168 | Alexander et al. | Apr. 5, 1960 |